April 26, 1955

B. L. ROSENBERG 2,706,915

WORM GEARING

Filed June 15, 1949

INVENTOR.
Bernard L. Rosenberg

BY

W. A. McGrew

ATTORNEY

INVENTOR.
Bernard L. Rosenberg

April 26, 1955   B. L. ROSENBERG   2,706,915
WORM GEARING

Filed June 15, 1949   3 Sheets-Sheet 3

INVENTOR.
Bernard L. Rosenberg
BY
W. A. McGrew
ATTORNEY

United States Patent Office 2,706,915
Patented Apr. 26, 1955

1

2,706,915

WORM GEARING

Bernard L. Rosenberg, Denver, Colo., assignor to Robbins Incubator Co., Denver, Colo., a corporation of Colorado Application June 15, 1949, Serial No. 99,271

7 Claims. (Cl. 74—425)

The present invention relates to worm gearing. It has to do particularly, although not exclusively, with such mechanism as employed in connection with incubators of the large egg capacity commercial type, wherein the cabinets are divided into several incubating compartments and one or more hatching compartments.

The four main essentials of an incubator of the commercial type are the production and control of the proper temperature and the correct amount of moisture within the compartments at all times, proper ventilation of the compartments and proper air circulation within the compartments, as well as the proper turning of the eggs at regular intervals during the time the eggs are present in the incubating compartments of the machine.

It has been found to be important to turn the eggs during incubation every three hours. At first this operation was performed manually and later certain automatic mechanism was provided in an effort to so turn the eggs at regular intervals. The present invention relates to new and improved means for shifting the egg racks in the incubator to turn the eggs in those racks once in every three hours.

One of the objects of the present invention is to provide an improved automatic egg turning mechanism which prevents accidents heretofore caused through maladjustment, by having the adjustment means of the mechanism out in open position where it can be readily observed by the operator.

Another object of the present invention is to provide mechanism of the foregoing character which provides greater structural strength than mechanisms heretofore known and used.

A further object of the present invention is to provide an improved egg turning mechanism having greater safety features than previously known mechanisms, thereby insuring freedom of accidents causing damage to the eggs.

Another object of the present invention is to provide an improved egg turning mechanism which is entirely automatic and in which the mechanism includes fixed bearings for supporting the worm shaft and includes means for protecting these bearings from damage which might be caused by the worm on the shaft.

A further object of the present invention is to provide mechanism of the foregoing character which is generally streamlined and thus of better appearance than previously known mechanisms employed for the purpose of turning eggs.

Another and very important feature of the present invention is to provide mechanism of the foregoing character which includes or has assocaited with it three different and separate means for stopping the operation of the parts in the event the turning mechanism might tend to cause the movement of the egg tray rack or racks beyond its predetermined tilted position in either direction.

The foregoing and other objects and advantages of the present invention will appear from the following description and appended claims when considered in connection with the accompanying drawings forming a part of this specification wherein like reference characters designate similar parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Figure 1:
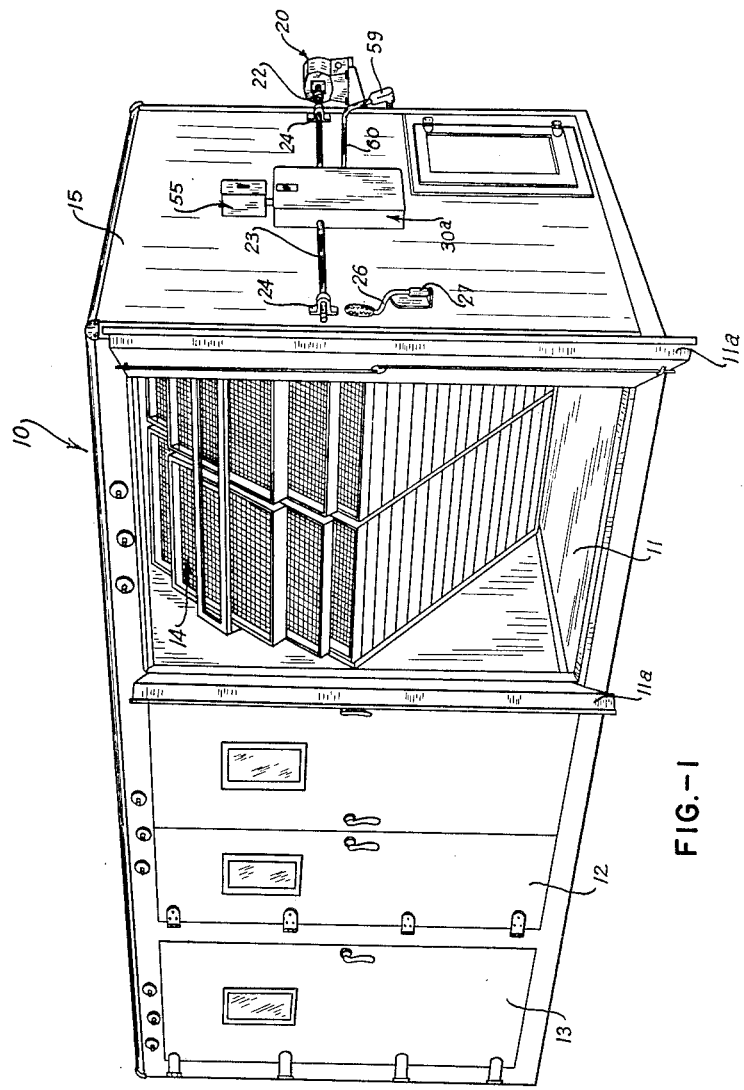
Fig. 1 is a perspective view of a commercial type incubator with the doors of one of the incubating compartments open to reveal the egg tray rack therein shown in its forward tilted position of approximately 47°, and embodying the egg turning mechanism of the present invention.
Figure 2:
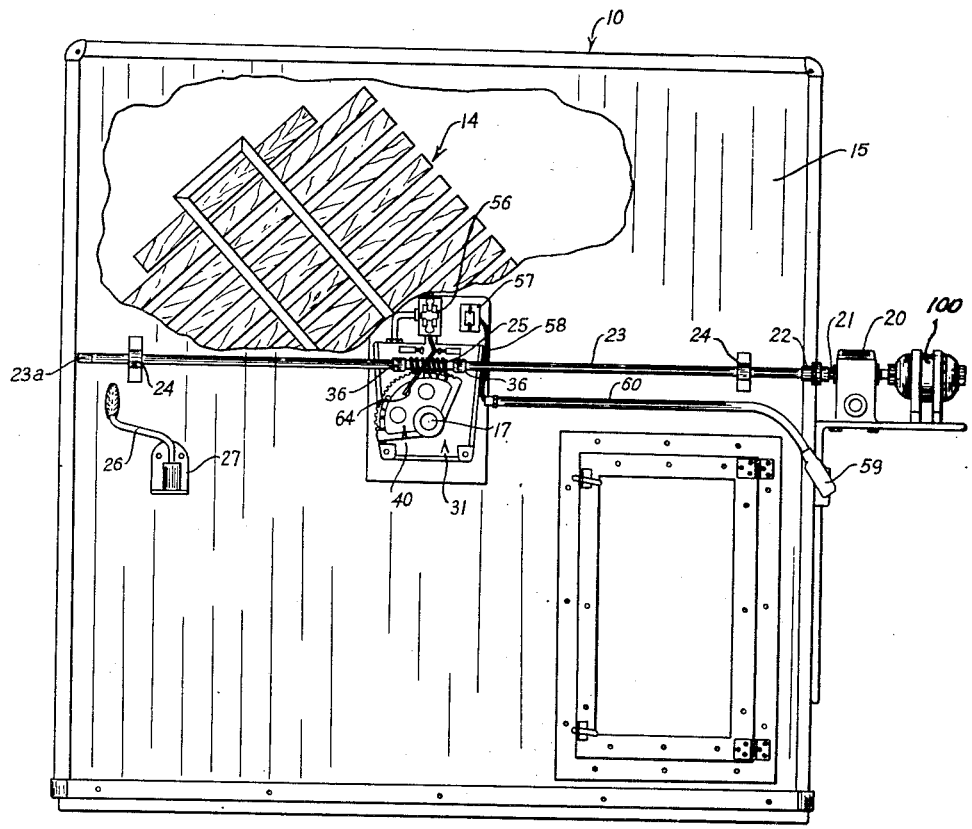
Fig. 2 is an end elevational view of the incubator of Fig. 1, partly broken away, and illustrating the automatic egg turning mechanism of the present invention.
Figure 3:
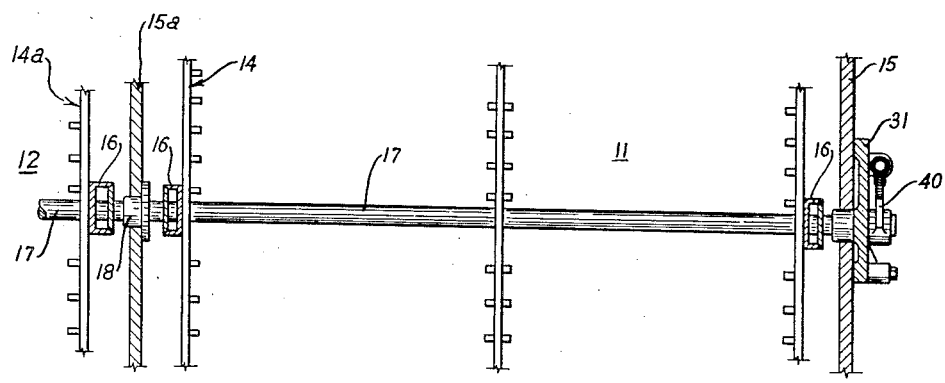
Fig. 3 is a fragmentary skeleton-like front elevational view of the incubator stripped down and showing the automatic egg turning mechanism, egg turning racks and supporting and turning shaft therefor.

Referring now particularly to Figs. 1, 2 and 3 of the drawings, 10 represents, as a whole, a commercial type incubator embodying the present invention. The particular incubator shown has a cabinet which is divided into three compartments. Compartments 11 and 12 are incubating compartments or sections and compartment 13 is a hatching compartment or section, the doors 11a of the compartment 11 being shown open to disclose the position of the egg tray rack and trays (without eggs) in the forward tilted position at approximately an angle of 47° from the vertical, the egg tray rack unit being indicated, as a whole, at 14. Only one end wall of the incubator cabinet is shown and is identified as 15 in Figs. 1, 2, 3 and 5.

In Fig. 3, a portion of the rack 14 of compartment 11 is shown and only a fragment of a similar rack 14a of the adjacent compartment 12, is shown. It is to be noted that rack 14 is reinforced by metal frame members 16 and that the rack is supported by a shaft 17 which extends through a bearing 18 in a wall or partition 15a and into the adjacent compartment 12 to similarly support the rack 14a located therein.

The shaft 17 is adapted to be rotated in opposite directions for the purpose of tilting the egg tray rack 14 from its forward tilted position to a similar rearward tilted position of approximately 47°. Power for this purpose is usually derived from a reversible type electric motor 100, see Fig. 2, and mounted on a bracket preferably at the rear of the incubator which is connected by suitable means to a gear reducing unit 20. The gear reducing unit driving shaft 21 is connected to a worm shaft 23 by a coupling device 22 which may, if desired, be a combined clutch and coupling assembly permitting the manual disconnecting of worm shaft 23 from reduction gear shaft 21. The worm shaft 23 is preferably supported upon the end wall 15 by hanger type bearing members 24 of any desired kind or type. The worm shaft 23 carries a worm 25 which is located approximately at an intermediate point between the ends of the shaft. While the worm shaft 23 is adapted to be driven, in opposite directions, by the electric motor and gear reduction mechanisms, should it become desirable to turn this shaft by hand, the forward end thereof has been squared at 23a to receive a socket wrench 26 which is mounted in a carrier 27 supported by the wall 15.

Referring now particularly to Figs. 2, 4, 5, 6 and 7, there is shown in these figures the new and improved gear assembly and mounting therefor which is employed for imparting rotative movement to shaft 17 at the regularly spaced intervals of three hours for the purpose of turning the eggs in the incubator every three hours. As shown, a flanged metallic panel or sheet 30 is placed against the end wall 15 and the new and improved mounting plate 31 is held against panel or sheet 30 and secured to the end wall 15 by suitable bolts and nuts 32, one being located adjacent each of the four corners of the mounting plate. The flanged panel or sheet 30 is in reality the base or bottom portion of a mechanism-enclosing housing or casing having a removable flanged cover portion which has been removed to reveal the parts in Figs. 4 and 5 but which is shown in its position of use and identified as 30a in Fig. 1.

It is to be noted that the mounting plate 31 is of tapered rectangular form or it could be said that it resembles generally the shape of a keystone, being narrower at its lower end than at its upper end. The plate is preferably cast or forged from steel and is provided with a hollow boss 33 which extends through an opening formed in sheet 30 and an opening in wall 15 to provide a bearing or journal for the outer end portion of shaft 17, see particularly Fig. 5. The lower corners of mounting plate 31 are so formed as to provide safety stops 34, see particularly Figs. 4 and 5. Thus, it will be seen that the mounting plate 31 is of extremely rigid construction, being provided at suitable points with reinforcing webs 31a and is securely and rigidly connected to and mounted upon end wall 15 by the bolts 32 located at four spaced points at the corners of the plate. Therefore, plate 31, with its hollow boss 32, provides an extremely sturdy bearing support for the outer end of shaft 17. To make a tight joint between the shaft and the boss 33, a ring or collar 35 is slipped over the shaft 17 and into engagement with boss 33, see Fig. 5.

The mounting plate 31 is also provided, adjacent its upper end, with a pair of integral or fixed bearings 36 which are spaced transversely of the mounting plate in a common substantially horizontal plane. These bearings 36 are provided for the purpose of receiving and supporting the driven worm shaft 23, previously referred to. It will be seen that the worm shaft 23 extends through the bearings and including said bearings, is supported at four spaced points upon end wall 15. The shaft 23 carries the worm 25, previously referred to and when the parts are assembled as seen particularly in Fig. 4, the worm 25 is disposed between the fixed bearings 36.

To prevent any damage to the fixed or permanent bearings 36, there is provided a pair of oil-impregnated washers or ring-like members 37, one for each of the bearings 36. These washers are approximately of one-eighth inch thickness and are formed from either bronze or brass. They may, however, vary in thickness. They are disposed at the inner face of bearings 36 and are interposed, therefore, between these bearings and the adjacent opposite ends of worm 35. Thus, should worm 35, through constant and hard usage, damage the oil-impregnated washers 37, they may be replaced with new washers with ease and facility. Moreover, the washers 37 protect the fixed bearings and prevent any damage to them which might be caused by worm 35.

The gear assembly of the present invention includes also a new and improved worm gear segment shown as a whole at 40. This worm gear segment is provided with a hub portion 41 which is slipped over the end of shaft 17 and keyed to the shaft by a key 42. The periphery of the worm gear segment 40 is provided with a series of worm teeth 43 which mesh with worm 25. It will be seen, note particularly Fig. 4, that the series of teeth terminate short of the ends of the segment as indicated at 44. This termination of the teeth may be effected in the casting of the worm gear or, if desired, the several teeth adjacent the ends may be brazed over to provide the smooth untoothed portions 44. Beyond the brazed portions at the very ends of the segment are provided safety stops 45 which, in the event the electrically operated safety devices of the invention do not function to stop the movement of segment 40 beyond a predetermined point, will contact the mounting plate safety stops 34 and immediately stop the action of the parts.

In addition to the electric safety devices for stopping the action and the cooperating segment safety stops and mounting plate safety stops 45 and 34, respectively, there is provided the so-called brazed portions 44 which, in the event of movement of the worm gear segment in either direction beyond a predetermined point because of failure of both the electrically operated stop mechanism and the stops 34 and 45, will jam with the worm 25 and positively stop the operation, thus preventing any possible spilling or damage to the eggs in the trays of the rack or racks. In the event the teeth 43 should extend through the safety stop portions 45 of the segment, in lieu of the brazing operation, a small metal plate could be secured to the segment to cover the end teeth at both sides. These attached plates would serve the same purpose as the brazed portions 44. For the purpose of maintaining the worm gear segment 31 tightly upon shaft 17, it may be desirable to provide one or more tightening screw assemblies such as that shown at 46 in Figs. 4, 6 and 7. As will be seen in Fig. 7 at the outer limit of swinging movement of worm gear segment 40, it is to be noted that the gear safety stop 45 is spaced approximately 1° from the adjacent mounting plate safety stop 34. This distance can, however, be varied by the adjustment of the limit switch actuators 50 and 51 carried by the worm gear segment 40.

The outer face of the worm gear segment adjacent the teeth 43 thereof is provided with a pair of spaced and adjustable limit switch actuators 50 and 51. These function in a manner to be presently described below.

Figure 4:
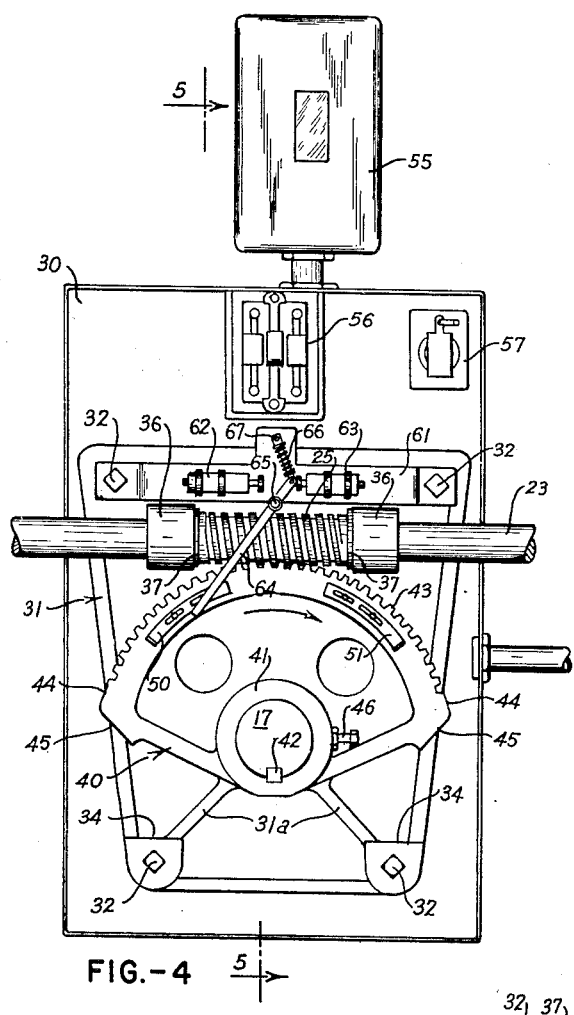
Fig. 4 is a front elevational view, on an enlarged scale, of the improved gearing and switch mechanism of the egg rack turning assembly, with the parts shown in one position while shifting the egg tray racks from one tilted position toward the opposite tilted position.
Figure 5:
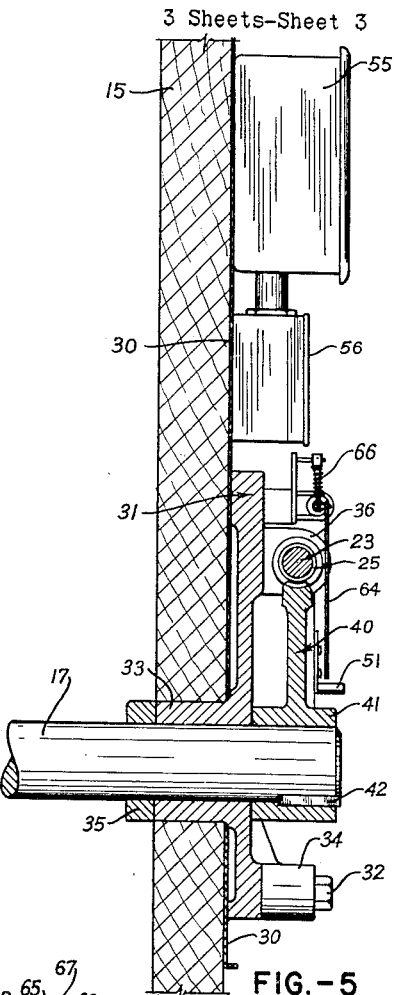
Fig. 5 is a vertical sectional view taken substantially along the line 5—5 of Fig. 4, looking in the direction of the arrows.

The electrical control and switch actuating mechanism which is associated with the gear assembly is clearly shown in enlarged Fig. 4 and comprises a time switch, shown as a whole at 55, an overload switch, shown as a whole at 56, and a conventional relay 57 into which the necessary electrical wiring, indicated generally at 58 in Fig. 2, extends, this wiring extending from outlet box 59 mounted on the cabinet and through conduit 60, also shown in Fig. 2. The wiring diagram employed may be virtually the same as employed in connection with incubators manufactured and sold by the assignee of the present application and need not be shown nor described in detail herein. The outer face of mounting plate 31 between the upper securing bolts 32 is provided with a limit switch bracket 61 upon which is mounted a pair of limit switches 62 and 63. The limit switch bracket may be mounted in any suitable manner and, if desired, may be extended so as to be supported upon the mounting plate by means of the bolts 32. Disposed in the space between the limit switches 62 and 63 is a limit switch trip assembly comprising a long arm 64 pivotally mounted at 65 upon plate 31 and having a trip action device including a spring, shown as a whole at 66, pivotally connected to its upper end and also pivotally connected at 67 to an upwardly projecting portion of mounting plate 31. The construction is such that the limit switch trip arm 64 is normally disposed to one side of center and held in such position by the coiled spring of the trip action device 66. As seen in Fig. 5, the upper end of arm 64 is in contact with limit switch 63. It is also shown in this position in Fig. 6, whereas in Fig. 7, the device has been tripped and shifted in the opposite direction so that the upper end of limit switch trip arm 64 is in contact with the other limit switch 62. It is to be understood that immediately the arm 64 is moved by either one of the limit switch actuators 50 or 51 about its pivot 65 beyond dead center, namely beyond a vertical position with respect to Fig. 4, the spring of the trip device 66 functions to snap the arm 64 over in the opposite direction to contact the opposite limit switch from which it has been in contact.

The operation of the automatic egg turning mechanism of the present invention is substantially as follows:

Assuming the egg tray rack or racks 14 are in their forward tilted position as seen in Figs. 1 and 2, it is desirable that they remain in this position for three hours. At the end of a three hour period, time switch 55 functions to start the reversible electric motor (not shown) and through the gear reduction mechanism 20, coupling member 22, worm shaft 23, worm 25, worm gear segment 40 and shaft 17, the egg tray rack 41 will be started in motion to move from its forward tilted position to its rearward tilted position (not shown). During this movement of the gearing assembly and associated parts, the worm gear segment moving in a clockwise direction, as indicated by the arrow in Fig. 4, will cause the outwardly projecting end portion of limit switch actuator 51 to engage limit switch trip arm 64 and move it in a counter-clockwise direction about its pivot 65. As soon as the arm reaches a vertical position or a point just slightly beyond the vertical position, the spring of trip device 66 functions to snap the arm 64 beyond dead center, causing it to assume approximately the position in which it is shown in Fig. 7.

Figures 6, 7:
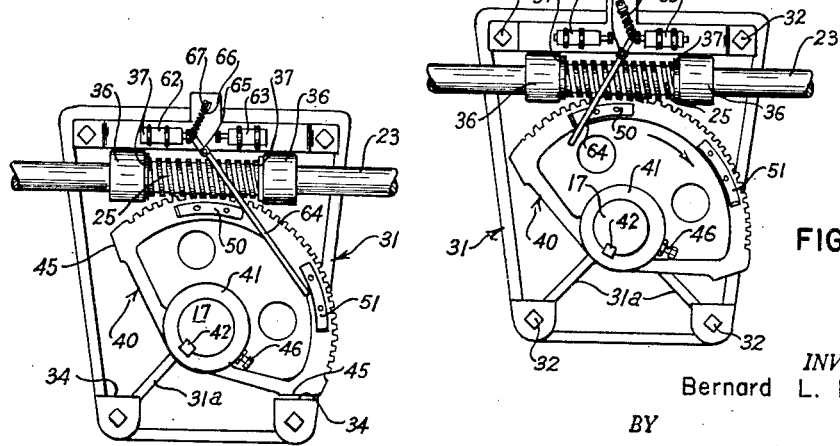
Fig. 6 is a front elevational view, on a somewhat reduced scale, of the gearing and associated parts shown in Figs. 4 and 5 and showing the parts in a further advanced stage of their shifting movement.
Fig. 7 is a view similar to Fig. 6 showing the parts in their postiions after having reached the end of one shifting movement.

Fig. 6 illustrates a representative intermediate position of the worm gear segment 40 between its positions of Fig. 4 and Fig. 7. With the upper end of arm 64 now in contact with limit switch 62, and the rack 14 in its rearward tilted position, the electric circuit to the reversible electric motor will be broken and the motor stopped. The parts will remain in this position for a period of three hours, at which time the time switch again functions to start the electric motor in the reverse direction, causing worm 25 to be rotated in the opposite direction and thus moving worm gear segment 40 in a reverse or counter-clockwise direction. While moving in a counter-clockwise direction, the projecting end portion of limit switch actuator 51 will come into contact with limit switch trip arm 64 and move it in a clockwise direction about its pivot 65 to a central position, whereupon the spring of device 66 will function to snap it over in the opposite direction and bring its upper end again into contact with limit switch 63. After the rack 14 has again reached its forward tilted position at an angle of approximately 47°, the circuit to the electric motor is again broken and the motor stopped, this in turn immediately halting or stopping the movement of all of the parts concerned.

It will be understood that any suitable wiring and in fact any suitable types of electric switches may be employed in lieu of the representative types illustrated and described herein. Moreover, it will be understood that by applying the socket wrench 26 to the squared end 23a of worm shaft 23, after coupling member 22 has been disconnected, it is possible to rotate shaft 17 by hand and thus shift the rack or racks from one tilted position to their opposite tilted position to thus turn the eggs. This choice of hand operation is desirable in the event anything should go wrong with the power means for automatically operating the turning mechanism.

The limit switch actuators 50 and 51 are adjustably mounted upon the segment 40 and may have their positions shifted so that they will contact the limit switch trip arm 64 sooner or later than they do as these parts are shown adjusted in the drawings.

By removing the cover 30a of the mechanism-enclosing housing, any suitable adjustments can be made quickly and easily. Moreover, these adjustments being in full view upon removal of the cover, there can be no possibility of accidents occurring through maladjustment. In other words, all of the operative parts of the automatic egg turning mechanism are in full view and within easy reach of the operator and the operation of the parts can thus be observed and adjustments made in a manner which was impossible with previously known automatic egg turning mechanisms.

I claim:

1. A gearing assembly for association with an incubator for periodically turning a rack-supporting shaft in the incubator, comprising a mounting plate of substantially keystone shape and having stop members at its lower corners, said plate having a hollow boss providing an outer end supporting bearing for the shaft, a worm gear segment mounted upon the outer end of said shaft and disposed adjacent the outer face of said plate, said gear segment being keyed to said shaft and having a series of worm gear teeth terminating at opposite ends short of the ends of said segment, the ends of said segment being formed to provide stop means adapted to be shifted into positions adjacent the stop means on said plate, and a driven shaft extending transversely across the plate above said worm gear segment and having a worm meshing with the teeth of the worm gear segment for moving said segment in opposite directions at predetermined times whereby to turn the rack supporting shaft alternately in opposite directions.

2. Structure according to claim 1, wherein fixed bearings are carried by front of the mounting plate to receive the worm shaft, said bearings being disposed adjacent opposite ends of the worm, and oil-impregnated metal washer-like members interposed between each of the bearings and the adjacent end of the worm to protect the fixed bearings from any possible damage by said worm.

3. A gearing assembly for association with an incubator for turning the supporting shaft for an egg tray rack in the incubator at predetermined regular times, said assembly comprising a steel mounting plate of tapered rectangular form wider at its upper end than at its lower end, said plate having a hollow boss formed therein and providing a bearing for said shaft, said plate having stop members formed at its lower corners and having a pair of substantially horizontally disposed spaced fixed bearings adjacent its upper end, a worm gear segment keyed to the outer end of said shaft, said segment having worm gear teeth formed on the periphery thereof, said teeth terminating short of the ends of said periphery, and a driven worm shaft extending through said fixed bearings and having a worm disposed between the bearings and meshing with the teeth of the worm gear segment whereby rotation of the worm shaft and worm in one direction will shift the worm gear segment to effect the turning of the supporting shaft in one direction and the rotation of the worm shaft in the opposite direction will turn said supporting shaft in the opposite direction.

4. Structure according to claim 3, wherein oil-impregnated bronze washers are mounted on the worm shaft and disposed between the fixed bearings and the adjacent ends of the worm.

5. For use in connection with a commercial type large capacity incubator having a pair of incubating compartments and a hatching compartment, an egg tray rack mounted in each of the incubating compartments, and an egg tray rack supporting shaft common to and provided for supporting and shifting the racks in both of the incubating compartments; an electric motor driven gear reducer for imparting power for rotating the egg rack supporting shaft, a gear assembly associated with the shaft and including a steel mounting plate having a hollow boss providing a bearing for one end of the egg tray rack supporting shaft, stop members formed at the lower corners of the mounting plate, fixed bearings spaced in substantially horizontal relationship located adjacent the upper outer face of the mounting plate, a worm gear segment keyed to the outer end of the egg tray rack supporting shaft and having a plurality of teeth on the periphery thereof, the several teeth at the outer ends of the series of teeth being brazed over to provide untoothed portions at the ends of the worm gear segment, a driven worm shaft connected to the gear reducer and journaled in the fixed substantially horizontally disposed bearings, a combined clutch and coupling member connecting the worm shaft and gear reducer, a worm disposed on the worm shaft and located between the bearings, said worm meshing with the teeth of the worm gear segment whereby upon rotation of the worm shaft and worm, the worm gear segment will be shifted alternately in opposite directions, the lower ends of said worm gear segment being provided with stops adapted in an emergency only to contact the stops carried by the mounting plate, and oil-impregnated washers associated with each of the fixed bearings and disposed between said bearings and the adjacent ends of the worm.

6. For use in connection with a commercial type incubator having an incubating compartment, an egg tray rack mounted in the compartment and an egg tray rack supporting shaft for supporting and shifting the rack in the compartment; an electric motor-driven gear reducer for imparting power to rotate the egg rack supporting shaft, a gear assembly associated with the shaft and including a mounting plate having means for supporting one end of the egg rack supporting shaft, stop members located at the lower corners of the mounting plate, fixed bearings in spaced substantially horizontal relationship located adjacent the upper outer face of the mounting plate, a worm gear segment keyed to the outer end of the egg tray rack supporting shaft and having a series of teeth on the periphery thereof, the several teeth at the outer ends of the series being brazed over to provide untoothed portions at the ends of the worm gear segment, a driven worm shaft connected to the gear reducer and journalled in the fixed bearings, a combined clutch and coupling member connecting the worm shaft and gear reducer, and a worm disposed on the worm shaft and located between said fixed bearings, said worm meshing with the teeth of the worm gear segment whereby upon rotation of the worm shaft and worm, the worm gear segment will be shifted alternately in opposite directions.

7. Motion transmitting means according to claim 6, wherein the lower ends of the worm gear segment are provided with stops adapted in an emergency only to contact the stops carried by the mounting plate.

References Cited in the file of this patent

UNITED STATES PATENTS

| | | |
|---|---|---|
| 1,351,267 | Teel | Aug. 31, 1920 |
| 1,635,758 | Lemon | July 12, 1927 |
| 1,651,959 | Meyers | Dec. 6, 1927 |
| 1,728,980 | Robbins | Sept. 24, 1929 |
| 1,742,954 | Gillette | Jan. 7, 1930 |
| 1,748,917 | Leake | Feb. 25, 1930 |
| 1,761,364 | Porter et al. | June 3, 1930 |
| 1,768,564 | Campbell | July 1, 1930 |
| 1,802,092 | Seiling | Apr. 21, 1931 |
| 1,839,934 | Stansbury | Jan. 5, 1932 |
| 1,878,503 | Martin | Sept. 20, 1932 |
| 2,078,443 | Clem | Apr. 27, 1937 |
| 2,176,745 | Petersime et al. | Oct. 17, 1939 |
| 2,274,640 | Smith | Mar. 3, 1942 |
| 2,328,347 | Kuo | Aug. 31, 1943 |
| 2,389,350 | Exner | Nov. 20, 1945 |
| 2,518,224 | Clen et al. | Aug. 8, 1950 |
| 2,571,818 | Blodgett | Oct. 16, 1951 |

FOREIGN PATENTS

| | | |
|---|---|---|
| 28,532 | Great Britain | Feb. 4, 1907 |